United States Patent [19]

Edwards

[11] 4,241,490
[45] Dec. 30, 1980

[54] METHOD OF APPLYING METAL SLEEVE TO CONCRETE REINFORCING BAR, METAL SLEEVE AND SWAGED CONNECTION

[75] Inventor: Hugh J. W. Edwards, Menston, England

[73] Assignee: CCL Systems, Limited, Surrey, England

[21] Appl. No.: 796,489

[22] Filed: May 12, 1977

[30] Foreign Application Priority Data

May 14, 1976 [GB] United Kingdom ............... 19956/76

[51] Int. Cl.³ .......................................... B23P 25/00
[52] U.S. Cl. ...................................... 29/459; 403/279; 403/281; 29/517
[58] Field of Search ............... 403/274, 285, 279, 300, 403/281, 283; 16/108, 109; 29/517, 459

[56] References Cited

U.S. PATENT DOCUMENTS

| | | | |
|---|---|---|---|
| 1,827,297 | 10/1931 | Moore | 29/459 |
| 2,149,209 | 2/1939 | Dickie et al. | 403/285 |
| 2,576,528 | 11/1951 | Matthysse | 403/283 X |
| 2,901,722 | 8/1959 | Arnott, Jr. | 403/285 X |
| 3,068,563 | 12/1962 | Reverman | 29/517 X |
| 3,143,366 | 8/1964 | Nichols | 403/16 |
| 3,551,999 | 1/1971 | Gutmann | 29/517 |
| 3,556,741 | 1/1971 | Bleecker | 29/459 X |
| 3,737,975 | 6/1973 | McKinnon, Jr. | 16/108 X |

FOREIGN PATENT DOCUMENTS

| | | |
|---|---|---|
| 2425524 | 11/1975 | Fed. Rep. of Germany . |
| 852105 | 10/1960 | United Kingdom . |
| 1432888 | 4/1976 | United Kingdom . |
| 1493005 | 11/1977 | United Kingdom . |

*Primary Examiner*—Andrew V. Kundrat
*Attorney, Agent, or Firm*—Caesar, Rivise, Bernstein & Cohen, Ltd.

[57] ABSTRACT

A method of applying a metal sleeve to a concrete reinforcing bar by introducing between opposed surfaces of the sleeve and the bar, particles having a hardness greater than that of the bar and the sleeve and then compressing the sleeve on to the bar with a sufficient force to cause the particles to bite into and grip both the bar and the sleeve.

The metal sleeve may be provided as having on its internal surface particles of the foregoing properties. The swaged connection is achieved by carrying out the foregoing method. The invention also contemplates a concrete reinforcing bar with the swaged connection.

2 Claims, 3 Drawing Figures

METHOD OF APPLYING METAL SLEEVE TO CONCRETE REINFORCING BAR, METAL SLEEVE AND SWAGED CONNECTION

This invention relates to a method of applying a metal sleeve to a concrete reinforcing bar, metal sleeve and swage connection.

It is known to swage a metal sleeve on to a ribbed concrete reinforcing bar using a compression tool. Because the formed connection is liable to be subject to a tensile load in use, it is necessary to ensure that the formed connection (which may be of the sleeve to one bar or the sleeve compressed on to two bars joined by the sleeve in end-to-end relation) has a certain tensile strength and there are standards prescribed appropriate to the particular bar on to which the sleeve is being swaged. To ensure that these standards are met one can use a predetermined ratio of the length of the sleeve to the diameter of the bar, and of course the lower the ratio is the cheaper it is to make the connection because less metal is used. For some forms of bar, however, particularly so-called square twisted chamfered bar, it is not possible to make an adequate connection by swaging unless an inconveniently high ratio is used and so other jointing systems, e.g. welding, must be used.

One object of the invention is to provide a method of swaging a metal sleeve to a concrete reinforcing bar of either hot worked or cold worked type in which the connection of the sleeve and the bar is improved.

According to the invention, there is provided a method of applying a metal sleeve to a concrete reinforcing bar comprising providing between opposed surfaces of the sleeve and the bar, particles having a hardness greater then that of both the bar and the sleeve, and then compressing the sleeve on to the bar with sufficient force to cause the particles to bite into and grip both the bar and the sleeve.

It has been found according to the invention that the size of the particles is important. If the particles are too small, there will be little improvement, while if they are too large the clearance between the sleeve and the bar has to be increased to a commercially and/or practically unacceptable degree to accommodate them. Preferably the particles have a maximum dimension of about 0.8 mm to about 1.5 mm and in practice a material including particles of different sizes within this range can be used. The particles may be of any shape, and are preferably formed of a hard metal such as chilled steel shot or chilled angular cast iron. Such materials are available as waste materials. Cemented carbide chips and diamond particles might also be used.

When the reinforcing bar is provided with ribs or similar deformations around its circumference (as is usually the case with reinforcing bars), it is preferred to apply the particles to the lands between the ribs. The particles may be secured to the inner surface of the sleeve, or to a pre-formed support member, which is preferably very thin, to be inserted between the sleeve and the bar.

The particles are suitably secured to the sleeve, bar or support member by a coating of an adhesive. The adhesive should exhibit no appreciable lubricating properties which might weaken the connection of the sleeve and the bar although it is possible to use an adhesive which has a certain amount of flexibility under load, provided it still allows the particles to grip the sleeve and the bar. Paints and like coating materials may be used as the adhesive, and plastics adhesives such as an epoxy resin/hardener system in a solvent base or a neoprene-based adhesive are especially suitable. In practice the coating of the adhesive should be as thin as possible and may be applied by brushing, spraying or the like.

The invention is of especial value in splicing concrete reinforcing bars in end-to-end relation. Such bars may be hot worked steel bars, cold worked steel bars including square twisted chamfered bars, and round steel bars.

In the method of the invention the metal sleeve is compressed on to the concrete reinforcing bar using any suitable equipment and preferably a press according to co-pending U.S. application Ser. No. 710,489, with sufficient pressure to cause the particles to bite into and grip both the sleeve metal and the metal of the bar.

Using the method of the invention it has been possible to use relatively low ratios of sleeve length to bar diameter. In the case of hot worked reinforcing bars the ratio can be as low as 1.6 for 25 mm diameter bar and 2.66 for 32 mm diameter bar. In the case of cold worked reinforcing bars, the ratio can be as low as 2.2 for 16 mm diameter bar, 2.3 for 20 mm diameter bar and 1.6 for 25 mm diameter bar. For a specialized cold worked bar such as square twisted chamfered which cannot otherwise be swaged, the ratio for 20 mm diameter bar can be as low as 2 and for 25 mm diameter bar as low as 1.6 Each of these ratios refers to a connection on one bar only; for two bars the ratio will be doubled.

The invention also includes a swaged connection made by the method, a metal sleeve for application to a concrete reinforcing bar, the sleeve having on the internal surface thereof particles having a hardness greater than that of both the bar and the sleeve, and a concrete reinforcing bar having on at least that part of the surface thereof to which a metal sleeve is to be applied particles having a hardness greater than that of both the bar and the sleeve.

The invention will be further illustrated by the following Examples wherein the shot or particulate material has a hardness greater than both the bar the sleeve:

EXAMPLE 1

Two 25 mm diameter concrete reinforcing bars of the type having two opposed longitudinal ribs and regularly spaced circumferential ribs on their surface were joined together by a coupler comprising an intermediate bar threaded at each end to be received in the threaded portion of a short sleeve compressed on to the end of a respective bar. Before the sleeve was compressed to the end of each bar, a coating of a two-part resin-based primer was applied to the lands between the ribs of the bar for a distance along the bar equal to the length of the sleeve to be compressed on to the bar. While the coating was still tacky there was then sprinkled on to the coating chilled steel shot having a size such that the shot just passed a 16 mesh sieve opening, the shot adhering to the coating so as to cover substantially the whole of the land area between adjacent ribs. The resin was allowed to harden and the sleeve was then compressed on to the bar, using equipment according to copending U.S. Application Ser. No. 710,489, until no gaps were present between the sleeve and the bar. The formed connection was then subjected to a longitudinal tensile stress until failure occured by breakage of the bar remote from the sleeve.

When compared to the result in a control test where there was no shot present in the same length of sleeve, the connection failed by reason of the bar being pulled out of the sleeve.

EXAMPLE 2

Tests were carried out using 25 mm and 32 mm diameter hot-worked steel bars complying with B.S. 4449. In each case a predetermined length of the unthreaded portion of a partially internally threaded sleeve was swaged on to the bar, the required pressure having previously been determined by inspection of samples to ensure absence of gaps between the sleeve and the bar. In the case of some sleeves, the swageable portion was coated internally with chilled angular cast iron particles of a size range 1.41 to 1.5 mm, in a coating of a two-part epoxy resin composition applied as a single layer. The internal diameter of the sleeves in these Examples was increased to allow for the extra thickness of the coating of particles. In the comparative Examples of this series, uncoated sleeves were used.

Each reinforcing bar with its sleeve compressed about one end was secured to one side of a tensile testing apparatus, and one end of a screw-threaded adapter was received in the threaded portion of the sleeve. The other end of the adapter was connected to a further reinforcing bar secured to the other side of the apparatus. The joint was then increasingly loaded until the reinforcing bar slipped out of the sleeve or broke, the tensile load at this point being noted.

The results given in Table 1 are the averages of three separate tests of each type. In the Table, L is the length of the sleeve swaged on to the bar and D is the nominal diameter of the bar. The target load is equivalent to the characteristic tensile strength of the bar being tested, plus 15% as defined in British Standard BS 449; 1969.

Table 1:

| | Hot-Worked Reinforcing Bars: | | | |
|---|---|---|---|---|
| Result | Bar Diameter (mm) | Particles Present | L/D | Maximum Tensile Load Achieved (% of Target) |
| A | 25 | NO | 1.6 | 110 |
| B | 25 | YES | 1.6 | 128 |
| C | 25 | NO | 3.4 | 128 |
| D | 32 | NO | 2.66 | 117 |
| E | 32 | YES | 2.66 | 131 |
| F | 32 | NO | 3.75 | 132 |

The results show that the presence of the layer of particles between the opposed surfaces of sleeve and bar prior to swaging increased the tensile efficiency of the joint obtained for a given pressed length in comparison with uncoated sleeves.

EXAMPLE 3

The test procedure described with reference to Example 2 was repeated using the same cast iron particles of Example 2 and a 16 mm diameter cold-worked reinforcing bar available in Britain under the trade name "TOR BAR". With iron particles present and pressed length/diameter ratio of 2.2, a maximum tensile load of 126% of the target load, which for such bars is, according to BS 4461; 1969, the characteristic tensile strength plus 10% .

EXAMPLE 4

Further tests using 16 mm diameter "Tor Bar" reinforcing bar were carried out, two lengths of bar being joined by a 110 mm long metal sleeve swaged along its length so as to secure the bars in end-to-end relation. Results obtained using sleeves coated internally with a layer of 16 mesh angular cast iron grit secured by an epoxy resin were compared with those obtained using sleeves containing no grit. Three similar tests for each type of sleeve were carried out, the joints being longitudinally tensile loaded until a bar slipped out of the sleeve or broke.

Where the sleeves contained no grit, each joint failed through a bar slipping out of the sleeve, whereas in each test where grit was used the joints did not fail, but a bar broke.

EXAMPLE 5

Further tests were carried out with 20 mm and 25 mm diameter "Tor Bar" cold-worked reinforcing bars and using the same cast iron particles of Example 2. In each test the maximum tensile load at failure was determined in the manner described with reference to Example 2. The results are given in Table 2.

Table 2:

| | Cold-Worked Reinforcing Bars ("Tor Bar"): | | | |
|---|---|---|---|---|
| Result | Bar Diameter (mm) | Particles Present | L/D | Maximum Tensile Load Achieved (% of Target) |
| A | 20 | NO | 2.75 | 100 |
| B | 20 | YES | 2.3 | 100 |
| C | 25 | NO | 1.6 | 71 |
| D | 25 | YES | 1.6 | 116 |

The results show that if the required tensile strength is to be achieved, the length of the sleeve can only be reduced if particles are present between the sleeve and the bar.

EXAMPLE 6

The procedure of Example 5 was repeated with the same cast iron particles of Example 2 and using cold-worked reinforcing bar of the square twisted chamfered type. The results are given in Table 3.

Table 3:

| | Cold-Worked Reinforcing Bars (Square Twisted Chamfered): | | | |
|---|---|---|---|---|
| Result | Bar Diameter (mm) | Particles Present | L/D | Maximum Tensile Load Achieved (% of Target) |
| A | 20 | NO | 3.5 | 47 |
| B | 20 | YES | 2.0 | 100 |
| C | 25 | YES | 1.6 | 112 |
| D | 25 | YES | 3.4 | 122 |
| E | 20 | YES | 3.5 | 118 |

In the control result A for 20 mm diameter bar, the bar slipped out of the sleeve at less than half the target load, although a relatively high L/D ratio was used. With the particles present satisfactory strengths were obtained even with L/D ratios as low as 2.0 for 20 mm bar and 1.6 for 25 mm bar.

The accompanying drawing is a diagrammatic representation of a swaged connection made in accordance with the invention. In the drawing.

Figure 1:
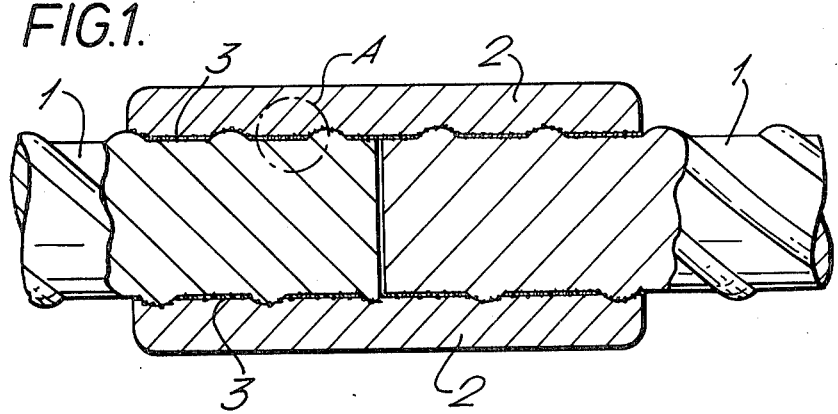
FIG. 1 is a partially cross-sectional view of two reinforcing bars, joined by a compressed sleeve.
Figure 2:
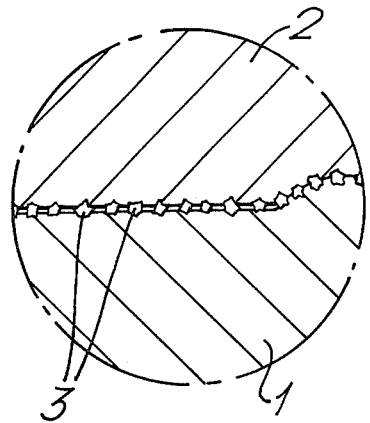
FIG. 2 shows in enlargement the portion of FIG. 1 indicated at A.
Figure 3:
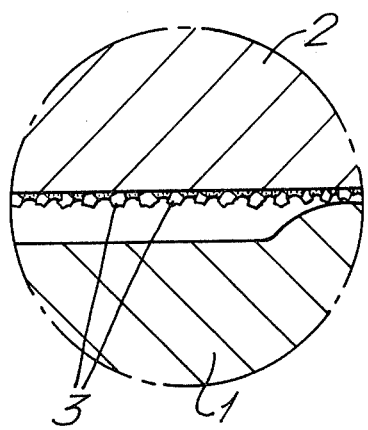
FIG. 3 shows the same view as in FIG. 2, before the swaging operation.

FIG. 1 shows two concrete reinforcing bars 1 joined together by a metal sleeve 2 compressed on to the bars arranged in end-to-end relation. The sleeve 2 is provided before compression with a layer of chilled angular cast iron particles 3 in the manner described in Example 2. The arrangement of the particles upon the inner surface of the sleeve before compression may be seen from FIG. 3. Upon compression of the sleeve 2, the particles 3 bite into the surfaces of the sleeve 2 and the bars 1 so that the sleeve grips the bars tightly. The layer of particles is shown in FIG. 2, and it will be seen that a mechanical bond is formed by the particles between the inner surface of the sleeve and the surfaces of the bars.

When a connection is made between a sleeve and a bar without using particles, there is a tendency for a very small permanent displacement of the sleeve to occur relative to the bar when the connection is subjected to axial tensile loading, and for some applications even this small degree of displacement may be unacceptable. It has been discovered that, when using the method of this invention with a low pressed length-/diameter ratio, the permanent displacement of the formed connection is reduced to a surprising degree, when compared with similar connections made without using particles. The reduction is typically about 50% and in some cases may be as much as 80%, despite the fact that there is no increase in pressed length. For this reason, a connection made according to the invention will satisfy rigorous industrial requirements of resistance to axial displacement under load, in additional to conferring the other advantages indicated above.

Without further elaboration the foregoing will so fully illustrate my invention that others may, by applying current or future knowledge, readily adapt the same for use under various conditions of service.

What is claimed as the invention is:

1. A method of applying a metal sleeve to a concrete reinforcing bar, said bar being formed of hot worked or cold worked steel, comprising providing between opposed surfaces of the sleeve and the bar, particles having a hardness greater than that of both the bar and the sleeve, and then compressing the sleeve on to the bar with sufficient force to cause the particles to bite into and grip both the bar and the sleeve, the ratio of the length of the sleeve to the diameter of the bar is in the case of a hot worked reinforcing bar about 1.6 for a 25 mm diameter bar and 2.6 for a 32 mm diameter bar, and in the case of a cold worked reinforcing bar, about 2.2 for a 16 mm diameter bar, 2.3 for a 20 mm diameter bar and 1.6 for a 25 mm diameter bar.

2. A method of applying a metal sleeve to a concrete reinforcing bar, said bar being formed of hot worked or cold worked steel, said cold worked steel bar being a square twisted chamfered bar, said method comprising providing between opposed surfaces of the sleeve and the bar, particles having a hardness greater than that of both the bar and the sleeve, and then compressing the sleeve on to the bar with sufficient force to cause the particles to bit into and grip both the bar and the sleeve, the ratio of the length of sleeve to the diameter of the bar is about 2 for a 20 mm diameter bar and about 1.6 for a 25 mm diameter bar.

* * * * *